United States Patent [19]

Kikuchi et al.

[11] Patent Number: 4,897,438

[45] Date of Patent: Jan. 30, 1990

[54] STABILIZED SYNTHETIC RESIN COMPOSITION

[75] Inventors: Tohru Kikuchi; Hiroyuki Kawakami; Takayuki Saito, all of Hitachi; Masaki Yagi, Omiya; Yutaka Nakahara, Okegawa; Hiroshi Takahashi, Koshigaya, all of Japan

[73] Assignee: Hitachi Chemical Company, Ltd., Tokyo, Japan

[21] Appl. No.: 160,341

[22] Filed: Feb. 25, 1988

[51] Int. Cl.$^4$ ............................................. C08K 5/13
[52] U.S. Cl. .................................... 524/342; 524/151; 524/304
[58] Field of Search .................. 524/342, 304, 151; 568/720

[56] References Cited

U.S. PATENT DOCUMENTS

| | | | |
|---|---|---|---|
| 2,731,442 | 1/1956 | Forman | 524/343 |
| 3,026,297 | 3/1962 | Spacht | 524/344 |
| 3,778,409 | 12/1973 | Oertel et al. | 524/344 |
| 3,930,047 | 12/1975 | Dale et al. | 568/744 |
| 3,996,198 | 12/1976 | Wang et al. | 528/205 |

FOREIGN PATENT DOCUMENTS 61-296024 12/1986 Japan .
62-45546 2/1987 Japan .

*Primary Examiner*—Veronica P. Hoke
*Attorney, Agent, or Firm*—Antonelli, Terry & Wands

[57] ABSTRACT

A synthetic resin composition comprising a synthetic resin and a special phenolic polymer is stabilized for a long period of time and excellent in heat resistance and light resistance.

7 Claims, No Drawings

STABILIZED SYNTHETIC RESIN COMPOSITION

BACKGROUND OF THE INVENTION

This invention relates to a stabilized synthetic resin composition containing a special phenolic polymer improved in heat resistance, light resistance, and the like.

It is known that polyethylene, polypropylene, ABS, polyvinyl chloride, and the like are deteriorated, colored, or lowered in mechanical strength by the action of heat and light so as to make these synthetic resins useless. In order to prevent these synthetic resins from such deterioration, various additives have been used alone or as a mixture thereof. Among these additives, phenolic antioxidants have a relatively large stabilizing effect and thus widely been used. But these antioxidants mostly lose their effects in a relatively short time, or rapidly, particularly when the synthetic resins are placed outdoors or in a humid atmosphere. Further, these effects are also undesirably lost during processing of these synthetic resins at high temperatures.

In order to improve these antioxidants in water resistance and volatility, there have been attempts to make molecular weight of these antioxidants higher. For example, U.S. Pat. Nos. 3,004,953; 3,328,489 and 3,996,198 disclose polymers of alkylphenols and dialkenyl benzenes. But when these polymers are used, the water resistance and volatility are improved to some extent but they are insufficient in anti-oxidant action. Further, when a synthetic resin compounded with such a polymer antioxidant is exposed to fluorescent tube illumination, there is a defect in that coloring is remarkable. Therefore, these polymer antioxidants are insufficient in practical utility.

SUMMARY OF THE INVENTION

It is an object of this invention to provide a synthetic resin composition stabilized for a long period of time by mixing an antioxidant which is excellent in water resistance, resistance to volatility and antioxidant action and can prevent coloring even if exposed to fluorescent tube illumination.

This invention provides a stabilized synthetic resin composition comprising a synthetic resin and a phenolic polymer represented by the formula:

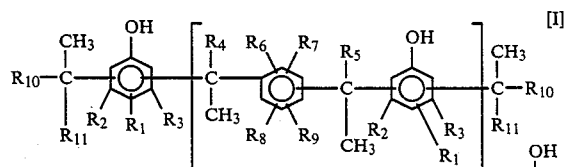

wherein $R_1$ is an alkyl group having 1 to 5 carbon atoms or an alkoxy group having 1 to 5 carbon atoms; $R_2$ and $R_3$ are independently hydrogen, an alkyl group having 1 to 5 carbon atoms or an alkoxy group having 1 to 5 carbon atoms; $R_4$ through $R_9$ are independently hydrogen, or an alkyl group having 1 to 5 carbon atoms; $R_{10}$ and $R_{11}$ are independently an alkyl group having 1 to 5 carbon atoms; and n is 2 or more and 75 or less in average.

DESCRIPTION OF THE PREFERRED EMBODIMENTS

The phenolic polymer represented by the formula:

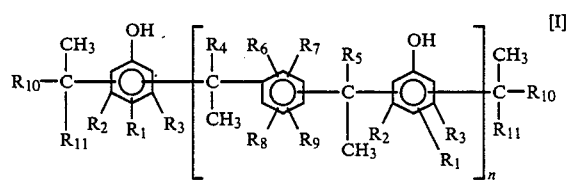

wherein $R_1$ is an alkyl group having 1 to 5 carbon atoms or an alkoxy group having 1 to 5 carbon atoms; $R_2$ and $R_3$ are independently hydrogen, an alkyl group having 1 to 5 carbon atoms or an alkoxy group having 1 to 5 carbon atoms; $R_4$ through $R_9$ are independently hydrogen, or an alkyl group having 1 to 5 carbon atoms; $R_{10}$ and $R_{11}$ are independently an alkyl group having 1 to 5 carbon atoms; and n is 2 or more and 75 or less in average, can be produced by reacting a phenolic compound of the formula:

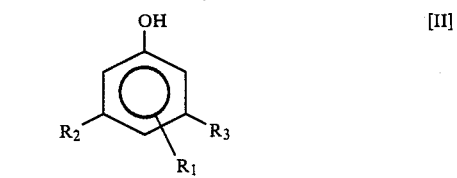

wherein $R_1$, $R_2$ and $R_3$ are defined above, with a bis(hydroxyalkyl)benzene compound of the formula:

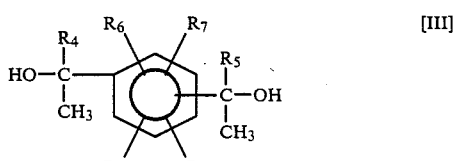

wherein $R_4$ through $R_9$ are as defined above, in the presence of an alkylation catalyst to yield a compound of the formula:

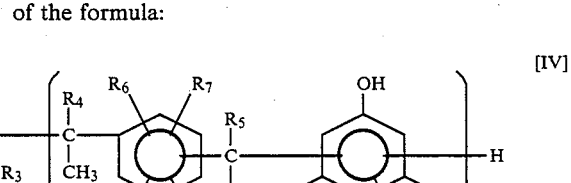

wherein $R_1$ through $R_9$ and n are as defined above, followed by reaction with a vinylidene type olefin compound of the formula:

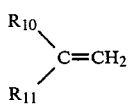

wherein $R_{10}$ and $R_{11}$ are defined above, or a tertiary alcohol of the formula:

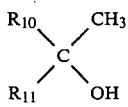

wherein $R_{10}$ and $R_{11}$ are as defined above, in the presence of an alkylation catalyst.

Examples of the phenolic compound of the formula [II] are o-cresol, p-cresol, o-methoxyphenol, p-methoxyphenol, o-ethylphenol, p-ethylphenol, o-propylphenol, p-propylphenol, o-butylphenol, p-butylphenol, o-amylphenol, p-amylphenol, o-cyclopentylphenol, p-cyclopentylphenol, 2,3-dimethylphenol, 3,4-dimethylphenol, 2,5-dimethylphenol, 3-methoxy-2-methylphenol, 3-methoxy-4-methylphenol, 2,3,5-trimethylphenol, 3,4,5-trimethylphenol, etc. These phenolic compounds can be used alone or as a mixture thereof.

It is necessary to use a phenolic compound having a hydrogen atom at two positions among three positions of the ortho positions and the para position with respect to the phenolic hydroxyl group, since two alkylation reaction sites are necessary to produce a linear phenolic polymer without gelation by alkylation reaction of the bis(hydroxyalkyl)benzene.

Examples of the bis(hydroxyalkyl)benzene compound of the formula [III] are m-bis(1-hydroxy-1-methylethyl)benzene, p-bis(1-hydroxy-1-methylethyl)benzene, m-bis(1-hydroxyethyl)benzene, p-bis(1-hydroxyethyl)benzene, m-bis(1-hydroxy-1-methylpropyl)benzene, p-bis(1-hydroxy-1-methylpropyl)benzene, etc. These compounds can be used alone or as a mixture thereof. Among them, m-bis(1-hydroxy-1-methylethyl)benzene and p-bis(1-hydroxy-1-methylethyl)benzene of the formula:

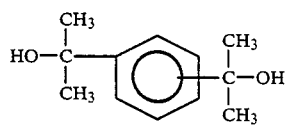

wherein the two hydroxyisopropyl groups are bonded to a meta position or para position, alone or as a mixture thereof, are preferable.

The catalyst used for carrying out the reaction is an alkylation catalyst. It is possible to use a cationic ion exchange resin, zeolite, a solid acid such as silica-alumina, etc., as the catalyst. Since to carry out the reaction in a homogeneous system is easier than in a heterogeneous system from the viewpoint of handling, it is preferable to use a Brönsted acid such as a mineral acid, e.g., sulfuric acid, hydrochloric acid, phosphoric acid, etc., para-toluenesulfonic acid, etc., or a Lewis acid such as boron trifluoride, a complex of boron trifluoride, etc.

The alkylation catalyst is preferably used in an amount of 0.2 to 10% by weight based on a total weight of the phenolic compound [II] and the bis(hydroxyalkyl)benzene compound [III]. If the amount is too small, it takes a longer reaction time while if the amount is too much, the removal of the catalyst after the reaction becomes complicated.

In the synthesis of the phenolic polymer of the formula [IV], it is preferable to use 0.67 mole or more to less than 1.00 mole of the bis(hydroxyalkyl)benzene compound of the formula [III] per mole of the phenolic compound of the formula [II]. If the amount of the compound [III] is too small, e.g., less than 0.67 mole, unreacted phenolic compound [II] is retained too much and the amount of the molecule of the formula [IV] wherein $n=1$ undesirably increases. On the other hand, if the amount of the compound [III] is too much, e.g., more than 1.0 mole, no terminal groups due to the phenolic compound are present, but only hydroxyl terminals are undesirably retained.

Further, in the above-mentioned reaction, the phenolic compound and the bis(hydroxyalkyl)benzene compound can be added dividedly, so long as the total amounts are within the above-mentioned amounts.

In order to prevent volatilization of the phenolic polymer of the formula [I] at the time of kneading with an engineering plastic or molding thereof, it is preferable to make the molecular weight of phenolic polymer [I] sufficiently high, for example, to make n 3 or more in average. For this purpose, it is preferable to use 0.80 mole or more and less than 1.0 mole of the bis(hydroxyalkyl)benzene compound [III] per mole of the phenolic compound [II].

The reaction of the compound [II] with the compound [III] is preferably carried out at 60° to 130° C. If the reaction temperature is too low, the reaction rate becomes slow, while if the reaction temperature is too high, the resulting phenolic polymer [IV] is easily colored. Since water is produced with the progress of the reaction, it is preferable to carry out the reaction at an azeotropic temperature of water and a solvent used.

As the solvent, there can be used paraffin series solvents such as n-hexane, cyclohexane, etc.; ketone series solvents such as acetone, methyl ethyl ketone, etc.; alcohol series solvents such as methanol, ethanol, etc.; aromatic solvents such as benzene, toluene, xylene, chlorobenzene, etc., alone or as a mixture thereof. As mentioned above, it is preferable to use a solvent which can form an azeotropic composition with water, can dissolve the polymer produced and does not pertain to the reaction by itself. As such a solvent, the use of aromatic solvents such as benzene, toluene, xylene, chlorobenzene, etc. is preferable.

The phenolic polymer of the formula [IV] thus obtained is a polymer having at least two repeating units represented by the parentheses in the formula [IV] and does not contain a homopolymer of the alkylating agent. This is because the double bond of diisopropenylbenzene is highly reactive and brings about polymerization of double bonds each other in addition to the alkylation reaction at 60° C. or higher, but the bis(hydroxyalkyl)benzene used in this invention is a bifunctional alcohol containing no double bond and does not cause homopolymerization substantially under the reaction conditions used in this invention mentioned above.

The phenolic polymer of the formula [IV] is then subjected to alkylation of ortho positions or para position with respect to the hydroxyl group of the terminal phenol groups with at least one compound selected from the group consisting of

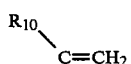

and

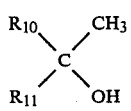

wherein $R_{10}$ and $R_{11}$ are independently an alkyl group having 1 to 5 carbon atoms, to yield the phenolic polymer of the formula [I].

Examples of the compound of the formula [V] are 2-methyl-1-propene, 2-methyl-1-butene, 2,4,4-trimethyl-1-pentene, etc. Among them, 2-methyl-1-propene is more preferable.

Examples of the compound of the formula [VI] are t-butyl alcohol, t-amyl alcohol, 2,4,4-trimethyl-2-pentanol, etc. Among them, t-butyl alcohol is more preferable.

The terminal alkylation reaction is preferably carried out subsequent to the synthesis of the phenolic polymer of the formula [IV]. In such a case, it is preferable to use 2 to 5 moles of the compound of the formula [V] or [VI] per mole of the phenolic polymer of the formula [IV]. The average molar number of the phenolic polymer of the formula [IV] is equal to difference in molar number between the phenolic compound [II] and the bis(hydroxyalkyl)benzene compound [III].

If the amount of the compound [V] or [VI] is too small, the hydrogen bonded to one position of ortho and para positions with respect to the hydroxyl group of the terminal phenol groups of the phenolic polymer [IV] is not alkyl substituted completely, while if the amount is too much, the amount of unreacted compound [V] or [VI] increases.

As the catalyst, the same catalyst as used in the alkylation reaction mentioned above can be used preferably in an amount of 0.2 to 10% by weight based on the weight of the polymer [IV]. When the phenolic polymer [I] is produced successively after the synthesis of the polymer [IV], since the alkylation catalyst used therein is retained, it is not necessary to newly add the catalyst into the reaction system.

The reaction of the polymer [IV] with the compound [V] and/or [VI] is preferably carried out at 60° to 130° C. When the compound [V] is used, the reaction temperature of 60° to 90° C. is preferable in order to prevent the homopolymerization. The reaction time is preferably 1 to 5 hours.

After the reaction, the reaction solution is subjected to after-treatment such as a method of washing or neutralization washing with water and a dilute (1-2%) alkaline washing solution of sodium hydroxide, potassium hydroxide, sodium carbonate, sodium bicarbonate, or the like, a method of adding an alkaline powder of sodium bicarbonate, magnesium oxide, or the like, stirring and filtering the neutralized salt, or a method of adding an amine such as triethylamine, triethanolamine, morpholine, or the like for neutralizing the catalyst. The reaction solution from which the catalyst is removed by neutralization and washing with water, or removed by filtration after neutralization, or the reaction solution after neutralization is subjected to heating under reduced pressure to remove the reaction solvent, remaining the compound of the formula [V] or [VI] and to separate the phenolic polymer of the formula [I]. When trace amounts of the remaining monomers and oligomers are found by analysis, it is preferable to reprecipitate the phenolic polymer [I] from a poor solvent for the polymer such as an alcoholic solvent, e.g. methanol, ethanol, or the like, or a paraffin series solvent, e.g. hexane, cyclohexane, or the like.

The thus obtained phenolic polymer of the formula [I] is a colorless or pale yellow amorphous resinous material wherein n in the formula [I] is 2 or more and 75 or less in average based on the number average molecular weight. The molecular weight of the polymer [I] is in a range of 696 to 69,000 in number average molecular weight, depending on the starting materials used. For example, when cresol, bis(1-hydroxy-1-methylethyl)benzene and α-methylstyrene or hydroxyisopropylbenzene are used as the starting materials, the molecular weight becomes 752 to 20,000 in number average molecular weight.

From the viewpoint of volatility, the value of n in the phenolic polymer of the formula [I] is preferably 3 or more in average based on the number average molecular weight. In this case, the number average molecular weight of the phenolic polymer becomes 934 or more.

In order to prevent blocking during storage, it is preferably to make the softening point of the phenolic polymer [I] 70° C. or higher. Further, from the viewpoint of compatibility with other resins or rubbers, the phenolic polymer wherein n in the formula [I] is 3 to 30 in average is particularly preferable.

As the synthetic resin to be stabilized, there can be used α-olefin polymers each as polyethylene, polypropylene, polybutene, poly-3-methylbutene, etc., copolymers of α-olefin such as ethylene-vinyl acetate copolymers, ethylene-propylene copolymers, etc., polyvinyl chloride, polyvinyl bromide, polyvinyl fluoride, polyvinylidene chloride, chlorinated polyethylenes, chlorinate polypropylenes, polyvinylidene fluorides, brominated polyethylenes, chlorinated rubber, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride terpolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate terpolymers, vinyl chloride-acrylic ester copolymers, vinyl chloride-maleic ester copolymers, vinyl chloride-methacrylic ester copolymers, vinyl chloride-acrylonitrile copolymers, halogen-containing synthetic resins such as internally plasticized polyvinyl chloride, etc., polystyrene, polyvinyl acetate, acrylic resins, copolymers of styrene and another monomer (e.g. maleic anhydride, butadiene, acrylonitrile, etc.), acrylonitrile-butadiene-styrene copolymers, acrylic ester-butadiene-styrene copolymers, methacrylic ester-butadiene-styrene copolymers, methacrylate resins such as poly(methyl methacrylate), polyvinyl alcohol, polyvinyl formal, polyvinyl butyral, polyethylene terephthalate, polybutylene terephthalate, whole aromatic polyesters, polycarbonates, polyacetals, polysulfones, polyamides, polyurethanes, polyphenylene oxides, phenol resins, urea resins, melamine resins, epoxy resins, unsaturated polyester resins, silicone resins, etc. It is also possible to use isoprene rubber, butadiene rubber, acrylonitrile-butadiene rubber, styrene-butadiene rubber, etc. These synthetic resins, engineering plastics and rubbers can be used alone or as a mixture thereof.

The composition of this invention may further contain one or more thioether antioxidants in order to improve oxidation stability remarkably. Examples of the thioether antioxidants are polyhydric alcohol esters of dialkyl thiodipropionate such as dilauryl thiodipropionate, dimyristyl thiodipropionate, distearyl thiodipropionate, etc., alkyl thiopropionate such as butyl thiopropionate, octyl thiopropionate, lauryl thiopropionate, stearyl thiopropionate, etc. Examples of the polyhydric alcohol are glycerin, trimethylolethane, trimethylolpropane, pentaerythitol, trishydroxyethyl isocyanurate, etc. Concrete examples of the esters are pentaerythritol tetralauryl thiopropionate, etc. The thioether antioxidant can preferably be used in amount of 0.01 to 5 parts by weight, more preferably 0.05 to 3 parts by weight, per 100 parts by weight of the synthetic resin.

The composition of this invention may further contain one or more other phenolic series antioxidants to further improve the oxidation stability. Examples of these phenolic antioxidants are 2,6-di-tert-butyl-p-cresol, 2,6-diphenyl-4-octadecyloxyphenol, stearyl-(3,5-dimethyl-4-hydroxybenzyl) thioglycolate, stearyl-$\beta$-(4-hydroxy-3,5-di-tert-butylphenyl) propionate, distearyl-3,5-di-tert-butyl-4-hydroxybenzyl phosphate, 2,4,6-tris(3',5'-di-tert-butyl-4'-hydroxybenzylthio)-1,3,5-triazine, distearyl(4-hydroxy-3-methyl-5-tert-butyl) benzylmalonate, 2,2'-methylenebis(4-methyl-6-tert-butylphenol), 4,4'-methylenebismethylenebis(2,6-di-tert-butylphenol), 2,2'-methylenebis[6-(1-methylcyclohexyl)p-cresol], bis[3,5-bis(4-hydroxy-3-tert-butylphenyl)-butyric acid] glycol ester, 4,4'-butylidenebis(6-tert-butyl-m-cresol), 2,2'-ethylidenebis(4,6-di-tert-butylphenol), 2,2'-ethylidenebis(4-sec-butyl-6-sec-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl-phenyl] terephthalate, 1,3,5-tris(2,6-dimethyl-3-hydroxy-4-tert-butylbenzyl) isocyanurate, 1,3,5-tris(3,5-di-tert-butyl-4-hydroxybenzyl)-2,4,6-trimethylbenzene, tetrakis[methylene-3-(3,5-di-tert-butyl-4-hydroxyphenyl)propionate]methane, 1,3,5-tris(3,5-di-tert-butyl-4-hydroxybenzyl) isocyanurate, 1,3,5-tris[(3,5-di-tert-butyl-4-hydroxyphenyl)propionyloxyethyl] isocyanurate, 2-octylthio-4,6-di(4-hydroxy-3,5-di-tert-butyl)phenoxy-1,3,5-triazine, 4,4'-thiobis(6-tert-butyl-m-cresol), etc.

The composition of this invention may further contain one or more phosphorus-containing compounds such as phosphites to improve light resistance and heat resistance. Examples of the phosphorus-containing compounds are tridecyl phosphite, octyl diphenyl phosphite, tris(2,4-di-tert-butylphenyl) phosphite, triphenyl phosphite, tris(mono, di-mixed nonylphenyl) phosphite, tris(nonylphenyl) phosphite, distearyl pentaerythritol diphosphite, hexa(tridecyl)-1,1,3-tris(2-methyl-5-tert-butyl-4-hydroxyphenyl)butane triphosphite, tetra(C-12-15 mixed alkyl)-4,4'-isopropylidene diphenyl diphosphite, tetra(tridecyl)-4,4'-butylidenebis(3-methyl-6-tert-butylphenol) diphosphite, bis(octylphenyl).bis[4,4'-butylidenebis(3-methyl-6-tert-butylphenol)].1,6-hexanediol diphosphite, phenyl.4,4'-isopropylidenediphenol.pentaerythritol diphosphite, bis(2,4-di-tert-butylphenyl)pentaerythritol diphosphite, di(nonylphenyl)pentaerythritol diphosphite, 9,10-dihydro-9-oxa-10-phosphaphenanthrene-10-oxide, tetrakis-(2,4-di-tert-butylphenyl)-4,4'-biphenylene diphosphite, etc.

The composition of this invention may further contain one or more light stabilizers to further improve light resistance. Examples of the light stabilizers are hydroxybenzophenones such as 2-hydroxy-4-methoxybenzophenone, 2-hydroxy-4-n-octoxybenzophenone, 2,2'-dihydroxy-4-methoxybenzophenone, 2,4-hydroxybenzophenone, etc.; benzotriazoles such as 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-methylphenyl)-benzotriazole, 2-(2'-hydroxy-3',5'-di-t-amylphenyl)benzotriazole, etc.; benzoates such as phenyl salicylate, p-t-butylphenyl salicylate, 2,4-di-t-butylphenyl-3,5-di-t-butyl-4-hydroxybenzoate, hexadecyl-3,5-di-t-butyl-4-hydroxybenzoate, etc.; Ni compounds such as Ni salt of 2,2'-thiobis(4-t-octylphenol), Ni salt of [2,2'-thiobis(4-t-octylphenolate)]-n-butylamine, [2,2'-thiobis(4-t-octylphenolate)]-n-butylamine Ni, (3,5-di-t-butyl-4-hydroxybenzyl)phosphonic acid monoethyl ester, etc.; piperidines such as bis(2,2,6,6-tetramethyl-4-piperidyl) sebacate, bis(1,2,2,6,6-pentamethyl-4-piperidyl)-n-butyl-3,5,-di-tert-butyl-4-hydroxybenzyl malonate, bis(1-acryloyl-2,2,6,6-tetramethyl-4-piperidyl)bis(3,5-di-tert-butyl-4-hydroxybenzyl)malonate, tetrakis(2,2,6,6-tetramethyl-4-piperidyl)butane-1,2,3,4-tetracarboxylate, 1-hydroxyethyl-2,2,6,6-tetramethyl-4-piperidinol/diethyl succinate condensate, 2-tert-octylamino-4,6-dichloro-1,3,5-triazine/1,6-bis(2,2,6,6-tetramethyl-4-piperidylamino)-hexane condensate, dibromoethane/-1,6-bis(2,2,6,6-tetramethyl-4-piperidylamino)hexane condensate, etc.; substituted acrylonitriles such as methyl $\alpha$-cyano-$\beta$-methyl-$\beta$-(p-methoxyphenyl)acrylate, etc.; oxalic acid dianilides such as N-2-ethylphenyl-N'-2-ethoxy-5-tert-butylphenyl oxalic acid diamide, N-2-ethylphenyl-N'2-ethoxyphenyl oxalic acid diamide, etc.

If necessary, the composition of this invention may further contain one or more heavy metal inactivating agents, nucleators, metallic soaps, organotin compounds, plasticizers, epoxy compounds, pigments, fillers, blowing agents, antistatic agents, flame retardants, lubricants, processing aids, etc.

The composition of this invention is excellent in heat resistance and light resistance.

This invention is illustrated by way of the following Synthesis Examples and Examples, in which all parts and percents are by weight unless otherwise specified.

First, Synthesis Examples of the phenolic polymer of the formula [I] are provided.

SYNTHESIS EXAMPLE 1

In a 1000-ml three-necked flask made of glass equipped with a Dean-Stark trap, 108 g (1.00 mole) of p-cresol, 165 g (0.85 mole) of m-bis(1-hydroxy-1-methylethyl)benzene, 150 g of toluene and 7.5 g of p-toluenesulfonic acid were placed and heated with stirring. When the temperature in the flask became 95° C., water began to be distilled together with toluene. The reaction was continued for 8 hours while maintaining the temperature in the flask at 105° C. The amount of water distilled was 30 ml. It was admitted that the m-bis(1-hydroxy-1-methylethyl)benzene was almost completely reacted. Then, the temperature of flask was lowered to 70° C. and 29.6 g (0.4 mole) of t-butyl alcohol was added to the flask, followed by stirring for 3 hours.

After completion of the reaction, the reaction solution in the flask was transferred to a 1-liter separatory funnel and 150 g of toluene was added thereto. The p-toluenesulfonic acid was removed by washing with deionized water five times. The toluene solution was treated with an evaporator to remove 150 g of toluene, followed by pouring into 500 ml of methanol with stirring to give a white precipitate. The precipitate was dried under reduced pressure to yield 215 g of a white powder. The analysis by high performance liquid chromatography revealed that the white powder was a polymer having a number average molecular weight of 1050 in terms of standard polystyrene. The resulting polymer was represented by the formula:

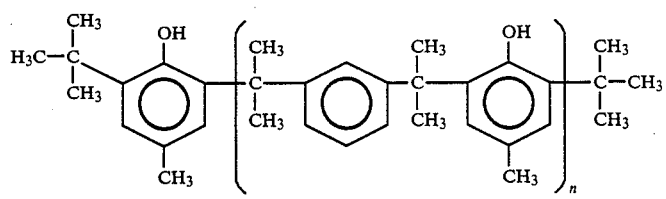

[I-1]

Thus, the value of n in the formula [I-1] became 3.1 in average. The weight average molecular weight was 1580, which means that the value of n in the formula [I-1] becomes 5.1 in average.

This was named as Stabilizer No. 1.

SYNTHESIS EXAMPLE 2

The process of Synthesis Example 1 was repeated except for using 175 g of m-bis(1-hydroxy-1-methylethyl)benzene and 18.5 g (0.25 mole) of t-butyl alcohol. The resulting polymer had a number average molecular weight of 1400 in terms of the standard polystyrene (n in the formula [I-1] being 4.4 in average), and a weight average molecular weight of 2150 (n in the formula [I-1] being 7.2 in average), measured by gel permeation chromatography.

This was named as Stabilizer No. 2.

SYNTHESIS EXAMPLE 3

The process of Synthesis Example 1 was repeated except for using 184 g of m-bis(1-hydroxy-1-methylethyl)benzene and 11.1 g (0.15 mole) of t-butyl alcohol. The resulting polymer had a number average molecular weight of 1800 (n=6.9 in average) and a weight average molecular weight of 2550 (n=8.8 in average), in terms of the standard polystyrene, measured by gel permeation chromatography.

This was named Stabilizer No. 3.

SYNTHESIS EXAMPLES 4 to 7

The process of Synthesis Example 1 was repeated except for using an alkylphenol as listed in Table 1 in place of the p-cresol. Number average molecular weights and weight average molecular weights of the resulting polymers in terms of the standard polystyrene were measured by gel permeation chromatography and listed in Table 1.

TABLE 1

| Synthesis Example No. | Alkylphenol | $\overline{M}w/\overline{M}n$ | Stabilizer No. |
|---|---|---|---|
| 4 | o-Cresol | 1600/1100 | 4 |
| 5 | p-Ethylphenol | 1650/1200 | 5 |
| 6 | p-sec-Butylphenol | 1800/1300 | 6 |
| 7 | p-tert-Butylphenol | 1800/1200 | 7 |

$\overline{M}w$ = weight average molecular weight
$\overline{M}n$ = number average molecular weight

SYNTHESIS EXAMPLE 8

In a 500-ml three-necked flask, 54 g (0.50 mole) of p-cresol, 79 g (0.50 mole) of p-diisopropenylbenzene, 130 g of toluene and 3.3 g of p-toluenesulfonic acid were placed and subjected to a temperature rise with stirring. The reaction was carried out at 105° C. for 8 hours.

After completion of the reaction, the same treatment as described in Synthesis Example 1 was conducted to yield 72 g of a white powder. The resulting polymer had a number average molecular weight of 2350 and a weight average molecular weight of 3850 in terms of the standard polystyrene measured by gel permeation chromatography, and a softening point of 185° C. Analysis by NMR spectrum using heavy chloroform as a solvent showed that there is a sharp peak due to the benzene ring proton at the meta position of p-cresol at 7.19 ppm, the amount thereof being about ⅓ that of benzene ring proton derived from p-diisopropenylbenzene. Further, it was admitted that there was methyl group proton due to p-cresol at 2.3 ppm and there were four slightly broad peaks at 2.1–2.5 ppm. These results show that the resulting polymer includes not only a 1:1 copolymer of p-cresol and p-diisopropenylbenzene, but also a homopolymer of p-diisopropenylbenzene and a polymer obtained by reacting an oligomer of p-diisopropenylbenzene with p-cresol. The obtained polymer is named as p-cresol/1,4-diisopropenylbenzene polymer.

EXAMPLE 1

| | | |
|---|---|---|
| Polypropylene resin | 100 | parts |
| Calcium stearate | 0.05 | part |
| Distearyl thiodipropionate | 0.2 | part |
| Stabilizer (shown in Table 2) | 0.1 | part |

The above-mentioned ingredients were mixed and kneaded at 180° C. for 5 minutes and subjected to compression molding at 180° C. and 250 kg/cm² for 5 minutes to prepare a sample with 0.5 mm in thickness.

Using this sample, thermal stability was measured in a Geer oven heated at 150° C. before and after immersion in a 10% aqueous solution of potassium hydroxide at 70° C. for 7 days. The thermal stability was evaluated by the time required for forming cracks on the sample.

The yellowing factor of the sample before and after fluorescent tube illumination for 72 hours was measured by using a Hunter color difference meter.

The results are shown in Table 2.

TABLE 2

|  |  | Stabilizer | Thermal stability | | Yellowing factor (%) | |
|---|---|---|---|---|---|---|
|  |  |  | Before immersion hrs | After immersion hrs | Before illumination | After illumination |
| Comparative Example | 1-1 | 1,3,5-Tris(3,5-di-tert-butyl-4-hydroxybenzyl)-2,4,6-trimethylbenzene | 1227 | 785 | 6.2 | 35.9 |
|  | 1-2 | p-Cresol/1,4-diisopropenylbenzene polymer | 1096 | 898 | 5.8 | 43.7 |
| Example | 1-1 | Stabilizer No. 1 | 1452 | 1235 | 5.2 | 23.8 |
|  | 1-2 | Stabilizer No. 2 | 1584 | 1398 | 5.1 | 23.4 |
|  | 1-3 | Stabilizer No. 3 | 1429 | 1272 | 5.2 | 23.5 |
|  | 1-4 | Stabilizer No. 4 | 1335 | 1126 | 5.6 | 27.7 |
|  | 1-5 | Stabilizer No. 5 | 1460 | 1231 | 5.2 | 24.0 |
|  | 1-6 | Stabilizer No. 6 | 1476 | 1259 | 5.3 | 24.3 |
|  | 1-7 | Stabilizer No. 7 | 1415 | 1179 | 5.3 | 24.8 |

EXAMPLE 2

| Polypropylene resin | 100 parts |
|---|---|
| Calcium stearate | 0.2 part |
| Dilauryl thiodipropionate | 0.4 part |
| Stabilizer (shown in Table 3) | 0.4 part |

The above-mentioned ingredients were pelletized by extrusion at 250° C., followed by injection molding at 250° C. to prepare a sample with 1 mm thick.

Using this sample, thermal stability was measured in a Geer oven heated at 160° C. before and after immersion in a 5% aqueous solution of sodium hypochlorite at 70° C. for 7 days. The thermal stability was evaluated by the time required for forming cracks on the sample.

The results are shown in Table 3.

TABLE 3

|  |  | Stabilizer | Thermal stability | |
|---|---|---|---|---|
|  |  |  | Before immersion hrs | After immersion hrs |
| Comparative Example | 2-1 | 1,3,5-Tris(3,5-di-tert-butyl-4-hydroxybenzyl)-2,4,6-trimethylbenzene | 840 | 322 |
|  | 2-2 | p-Cresol/1,4-diisopropenylbenzene polymer | 754 | 457 |
|  | 2-3 | 1,4-Bis[1-methyl-1-(2-hydroxy-3-tert-butyl-5-methylphenyl)-ethyl]benzene | 685 | 291 |
| Example | 2-1 | Stabilizer No. 1 | 1005 | 824 |
|  | 2-2 | Stabilizer No. 2 | 1064 | 907 |
|  | 2-3 | Stabilizer No. 3 | 1033 | 885 |
|  | 2-4 | Stabilizer No. 4 | 902 | 735 |
|  | 2-5 | Stabilizer No. 5 | 1024 | 844 |
|  | 2-6 | Stabilizer No. 6 | 988 | 836 |
|  | 2-7 | Stabilizer No. 7 | 975 | 806 |

EXAMPLE 3

| ABS resin (Stylac 200, a trade name mfd. by Asahi Kasei Kogyo Kabushiki Kaisha) | 100 parts |
|---|---|
| Calcium stearate | 1.0 part |
| Stabilizer (shown in Table 4) | 0.3 part |

The above-mentioned ingredients were pelletized by extrusion at 200° C., followed by injection molding at 230° C. to prepare a sample. The sample was heated at 135° C. in a Geer oven for 30 hours to measure a whiteness degree by measuring the degree of coloring using a Hunter color difference meter. Further, Izod impact strength was also measured at 20° C. before and after heating the sample at 135° C. in a Geer oven for 30 hours.

The results are shown in Table 4.

TABLE 4

|  |  | Stabilizer | Whiteness degree % | Izod impact strength (kg · cm/cm) | |
|---|---|---|---|---|---|
|  |  |  |  | Before heating | After heating |
| Comparative Example | 3-1 | 1,3,5-Tris(3,5-di-tert-butyl-4-hydroxybenzyl)-1,3,5-trimethylbenzene | 22.5 | 17.5 | 14.2 |
|  | 3-2 | p-Cresol/1,4-diisopropenylbenzene polymer | 16.4 | 17.0 | 12.4 |
| Example | 3-1 | Stabilizer No. 1 | 28.4 | 17.7 | 16.4 |
|  | 3-2 | Stabilizer No. 2 | 30.8 | 18.4 | 17.0 |
|  | 3-3 | Stabilizer No. 3 | 30.5 | 18.2 | 16.8 |
|  | 3-4 | Stabilizer No. 4 | 27.3 | 17.3 | 16.1 |
|  | 3-5 | Stabilizer No. 5 | 29.5 | 17.8 | 16.6 |
|  | 3-6 | Stabilizer No. 6 | 29.0 | 17.6 | 16.5 |
|  | 3-7 | Stabilizer No. 7 | 28.2 | 17.4 | 16.3 |

EXAMPLE 4

| | |
|---|---|
| Poly(2,6-dimethyl-1,4-phenylene oxide) (intrinsic viscosity 0.56 dl/g in chloroform at 25° C.) | 50 parts |
| Polystyrene | 47.5 parts |
| Polycarbonate | 2.5 parts |
| Titanium oxide | 3.0 parts |
| Stabilizer (shown in Table 5) | 0.3 part |

The above-mentioned ingredients were mixed in a Henschel mixer sufficiently, pelletized by an extruder, followed by formation of a sample by injection molding. The sample was heated at 125° C. for 100 hours in a Geer oven, followed by measurement of the retention rate of elongation and retention rate of Izod impact strength.

The results are shown in Table 5.

TABLE 5

| | | Stabilizer | Retention rate (%) | |
|---|---|---|---|---|
| | | | Elongation | Impact value |
| Comparative Example | 4-1 | None | 31 | 46 |
| | 4-2 | p-Cresol/1,4-diisopropenyl-benzene polymer | 37 | 53 |
| Example | 4-1 | Stabilizer No. 1 | 49 | 62 |
| | 4-2 | Stabilizer No. 2 | 55 | 67 |
| | 4-3 | Stabilizer No. 3 | 54 | 67 |
| | 4-4 | Stabilizer No. 4 | 45 | 60 |
| | 4-5 | Stabilizer No. 5 | 53 | 65 |
| | 4-6 | Stabilizer No. 6 | 49 | 63 |
| | 4-7 | Stabilizer No. 7 | 51 | 63 |

EXAMPLE 5

To a mixture of polyarylate (mol. wt. 20,000) obtained from mixed dicarboxylic acids of terephthalic acid and isophthalic acid in a molar ratio of 1:1 and bisphenol A, with bisphenol A.polycarbonate (mol. wt. about 20,000) in a weight ratio of 60/40, 0.2% by weight of a stabilizer (shown in Table 6) was added, followed by kneading at 300° C. in a melt extruder. Then, pelletization was carried out and a sample was prepared by injection molding. Using the resulting sample, a heat distortion temperature and Izod impact strength were measured. Further, injection molding was carried out at various molding temperatures to inspect a temperature for producing foaming.

The results are shown in Table 6.

TABLE 6

| | | Stabilizer | Izod impact strength (kg · cm/cm) | Heat distortion temperature (°C.) | Foaming temperature (°C.) |
|---|---|---|---|---|---|
| Comparative Example | 5-1 | None | 38 | 158 | 345 |
| | 5-2 | 4,4'-Butyledene-bis-(6-t-butyl-3-methylphenol) | 39 | 158 | 360 |
| Example | 5-1 | Stabilizer No. 1 | 40 | 158 | 375 |
| | 5-2 | Stabilizer No. 2 | 41 | 158 | 380 |
| | 5-3 | Stabilizer No. 3 | 41 | 158 | 385 |
| | 5-4 | Stabilizer No. 4 | 40 | 158 | 370 |
| | 5-5 | Stabilizer No. 5 | 41 | 158 | 375 |
| | 5-6 | Stabilizer No. 6 | 40 | 158 | 380 |
| | 5-7 | Stabilizer No. 7 | 40 | 158 | 375 |

EXAMPLE 6

Polybutylene terephthalate resin in an amount of 100 parts and a stabilizer as shown in Table 7 in an amount as shown in Table 7 were mixed with heating at 100° C. for 4 hours (dry up), followed by kneading at 260° C. in a melt extruder. After pelletization, a sample was formed by injection molding. The resulting sample was heated at 250° C. for 30 or 60 minutes in a Geer oven to measure degree of thermochromism. Further, a melt viscosity of pellets was measured by using a Koka type flow tester with heating at 300° C. for 1 or 3 minutes to calculate melt viscosity retention rate during that period. The smaller retention rate shows progressed deterioration.

The results are shown in Table 7.

TABLE 7

| | | Stabilizer | Amount of stabilizer | Degree of thermochromism | | Melt viscosity (poise) | | Retention rate |
|---|---|---|---|---|---|---|---|---|
| | | | | After 30 min. | After 60 min. | After 1 min. | After 3 min. | |
| Comparative Example | 6-1 | 1,3,5-Tris(3,5-di-tert-butyl-4-hydroxybenzyl)isocyanurate | 0.1 | 3 | 5 | 1249 | 383 | 31% |
| | 6-2 | 1,3,5-Tris(3,5-di-tert-butyl-4-hydroxybenzyl)isocyanurate | 0.1 | | | | | |
| | | Bis(2,4-di-tert-butylphenyl)pentaerythritol diphosphite | 0.1 | 2 | 4 | 1318 | 472 | 36% |
| Example | 6-1 | Stabilizer No. 1 | 0.1 | 3 | 4 | 1257 | 515 | 41% |
| | 6-2 | Stabilizer No. 2 | 0.1 | 3 | 4 | 1271 | 565 | 44% |
| | 6-3 | Stabilizer No. 3 | 0.1 | 3 | 4 | 1304 | 527 | 40% |
| | 6-4 | Stabilizer No. 4 | 0.1 | 3 | 4 | 1243 | 461 | 37% |
| | 6-5 | Stabilizer No. 5 | 0.1 | 3 | 4 | 1346 | 563 | 42% |
| | 6-6 | Stabilizer No. 2 | 0.1 | | | | | |

TABLE 7-continued

| | Stabilizer | Amount of stabilizer | Degree of thermochromism | | Melt viscosity (poise) | | Retention rate |
|---|---|---|---|---|---|---|---|
| | | | After 30 min. | After 60 min. | After 1 min. | After 3 min. | |
| | Bis(2,4-di-tert-butylphenyl)penta-erythritol diphosphite | 0.1 | 1 | 3 | 1561 | 659 | 42% |
| 6-7 | Stabilizer No. 2 Tris(2,4-di-tert-butylphenyl) phosphite | 0.1 0.1 | 1 | 3 | 1378 | 582 | 42% |
| 6-8 | Stabilizer No. 2 Distearyl penta-erythritol diphosphite | 0.1 0.1 | 1 | 3 | 1480 | 607 | 41% |

In the evaluation of degree of thermochromism, the most remarkable coloring was defined as 5 and the least coloring was defined as 1, and evaluation was conducted relatively by 5 grades.

EXAMPLE 7

Polyacetal resin in an amount of 100 parts and 0.1 part of a stabilizer shown in Table 8 were dried up at 80° C. for 3 hours, followed by extrusion at 200° C. to prepare pellets. Using these pellets, a sheet of 2 mm thick was prepared by injection at 220° C. This sheet was exposed to fluorescent tube illumination for 72 hours to measure yellowing factor and to test thermochromism. The yellowing factor was measured by using a Hunter color difference meter.

The results are shown in Table 8.

TABLE 8

| | | Stabilizer | Fluorescent tube discoloration (Yellowing factor %) | | Thermochromism (Yellowing factor %) | |
|---|---|---|---|---|---|---|
| | | | Before illumination | After illumination | After 24 hrs | After 72 hrs |
| Comparative Example | 7-1 | 4,4'-Butylidene (6-tert-butyl-m-cresol) | 9.6 | 24.8 | 38.9 | 65.5 |
| | 7-2 | 2,2'-Methylenebis)4-methyl-6-tert-butylphenol) | 10.2 | 26.2 | 60.1 | 71.8 |
| Example | 7-1 | Stabilizer No. 1 | 8.4 | 15.2 | 27.9 | 55.9 |
| | 7-2 | Stabilizer No. 2 | 8.7 | 15.7 | 27.1 | 56.0 |
| | 7-3 | Stabilizer No. 3 | 7.6 | 13.3 | 28.0 | 56.3 |
| | 7-4 | Stabilizer No. 4 | 8.7 | 15.8 | 27.5 | 58.4 |
| | 7-5 | Stabilizer No. 5 | 8.1 | 14.7 | 29.2 | 54.6 |
| | 7-6 | Stabilizer No. 6 | 7.9 | 14.2 | 28.9 | 52.1 |
| | 7-7 | Stabilizer No. 7 | 8.6 | 17.1 | 28.0 | 54.0 |

What is claimed is:

1. A stabilized synthetic resin composition comprising a synthetic resin and phenolic polymer represented by the formula:

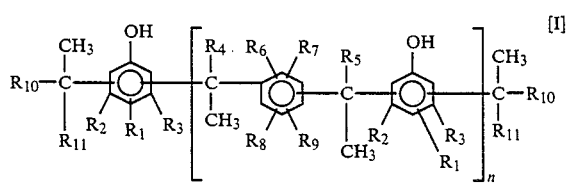

wherein $R_1$ is an alkyl group having 1 to 5 carbon atoms or an alkoxy group having 1 to 5 carbon atoms; $R_2$ and $R_3$ are independently hydrogen, an alkyl group having 1 to 5 carbon atoms or an alkoxy group having 1 to 5 carbon atoms; $R_4$ through $R_9$ are independently hydrogen, or an alkyl group having 1 to 5 carbon atoms; $R_{10}$ and $R_{11}$ are independently an alkyl group having 1 to 5 carbon atoms; and n is 2 or more and 75 or less in average.

2. A resin composition according to claim 1, wherein the phenolic polymer of the formula [I] is a polymer represented by the formula:

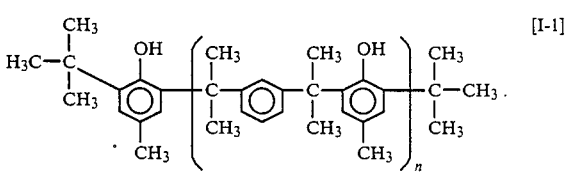

wherein n is 2 to 75 in average.

3. A resin composition according to claim 1, wherein the synthetic resin is an α-olefin homopolymer or copolymer.

4. A resin composition according to claim 1, wherein the synthetic resin is a rubber.

5. A resin composition according to claim 1, wherein the synthetic resin is an engineering plastic selected from the group consisting of polyethylene, polypropylene, polyvinyl chloride, polystyrene, acrylic resins, acrylonitrile-butadiene-styrene copolymers, whole aromatic polyesters, polybutylene terephthalate, polycarbonates, polyacetals, polysulfones, polyamides, polyphenylene oxides, phenol resins and urea resins.

6. A resin composition according to claim 1, which further comprises one or more thioether antioxidants.

7. A resin composition according to claim 1, which further comprises one or more antioxidant phosphorus-containing compounds.

* * * * *